US008695739B2

(12) United States Patent
Waszak et al.

(10) Patent No.: US 8,695,739 B2
(45) Date of Patent: *Apr. 15, 2014

(54) MODULAR AUXILIARY POWER UNIT ASSEMBLY FOR AN ELECTRIC VEHICLE

(71) Applicant: General Electric Company, Schenectady, NY (US)

(72) Inventors: Michal-Wolfgang Waszak, Munich (DE); Parag Vyas, Munich (DE); Jan Hemmelmann, Munich (DE); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,962

(22) Filed: Feb. 15, 2013

(65) Prior Publication Data

US 2013/0158765 A1      Jun. 20, 2013

Related U.S. Application Data

(62) Division of application No. 12/362,218, filed on Jan. 29, 2009, now Pat. No. 8,376,070.

(51) Int. Cl.
　　*B60W 10/00*　　(2006.01)
　　*B60W 10/06*　　(2006.01)
(52) U.S. Cl.
　　USPC ............... 180/65.265; 180/65.275; 180/65.8

(58) Field of Classification Search
　　USPC ......... 180/65.245, 65.285, 65.8; 60/595, 596; 123/46 R, 46 A, 46 B, 46 SC, 46 H
　　See application file for complete search history.

(56) References Cited

U.S. PATENT DOCUMENTS

| 4,385,597 | A | 5/1983 | Stelzer |
| 5,775,273 | A * | 7/1998 | Beale ........................ 123/46 B |
| 6,541,875 | B1 * | 4/2003 | Berlinger et al. ............ 290/1 R |
| 7,338,335 | B1 * | 3/2008 | Messano .................... 180/65.22 |
| 2004/0030469 | A1 | 2/2004 | MacBain |
| 2005/0028520 | A1 | 2/2005 | Chertok |
| 2006/0124083 | A1 * | 6/2006 | Niiyama et al. ............ 123/46 R |
| 2008/0098972 | A1 * | 5/2008 | Elwart .................... 123/142.5 E |

* cited by examiner

*Primary Examiner* — Hau Phan
*Assistant Examiner* — Bryan Evans
(74) *Attorney, Agent, or Firm* — Ziolkowski Patent Solutions Group, SC; Jean K. Testa

(57) ABSTRACT

A system and method for a propulsion system includes an electric motor and an energy storage unit configured to supply a primary power to the electric motor. The propulsion system also includes a plurality of auxiliary power units (APUs) configured to supply a secondary power to at least one of the electric motor and the energy storage unit. Each of the plurality of APUs includes a free-piston engine configured to generate a mechanical output, a linear generator configured to transform the mechanical output to an electrical power, and a controller. The controller receives a power command from the electric motor and/or the energy storage unit, determines an amount of secondary power needed to meet the power command, and selectively activates a number of the plurality of APUs to generate the needed amount of secondary power.

11 Claims, 3 Drawing Sheets

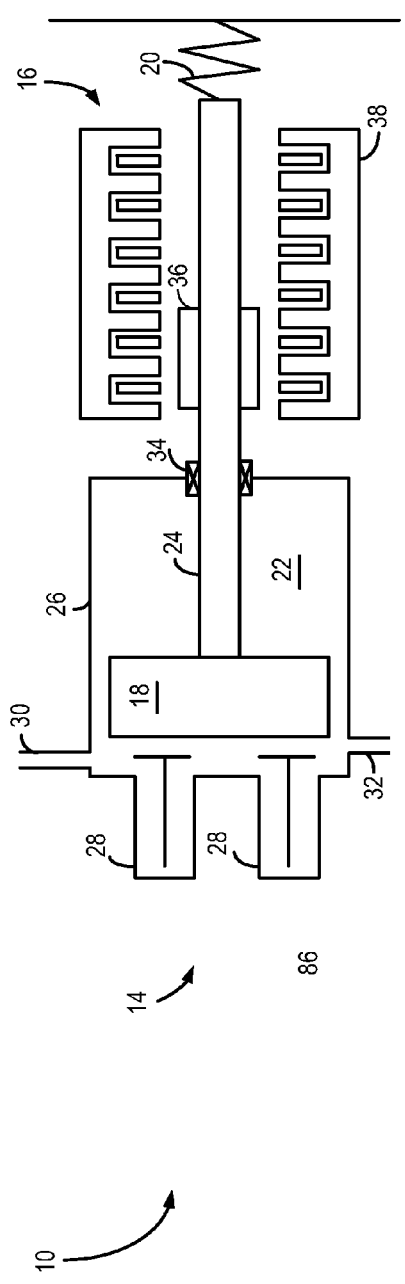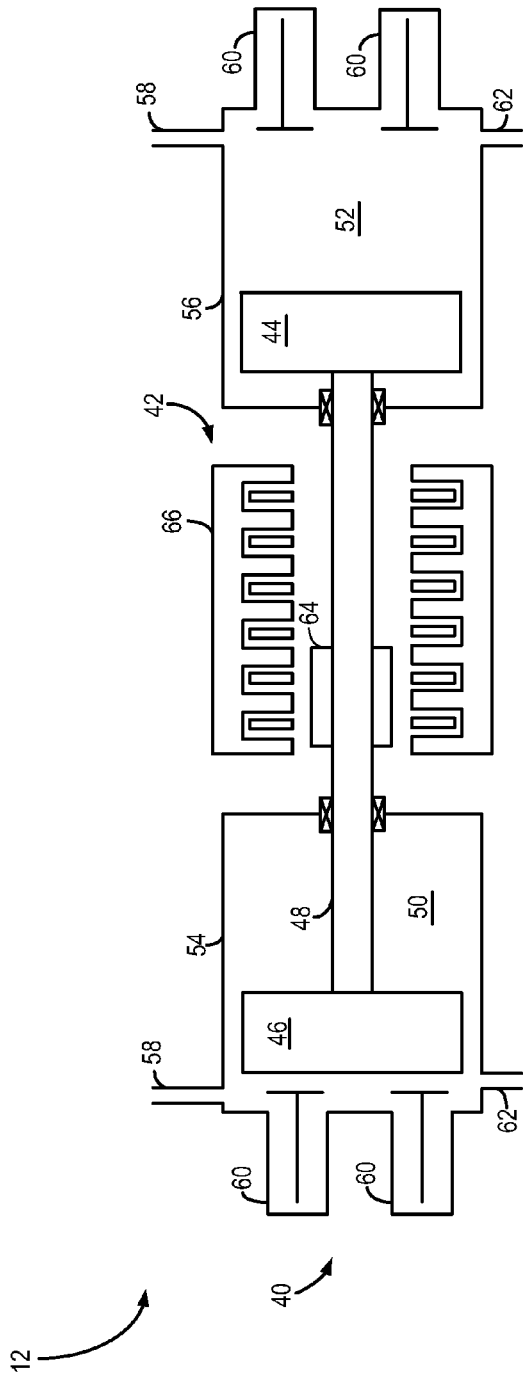

MODULAR AUXILIARY POWER UNIT ASSEMBLY FOR AN ELECTRIC VEHICLE

CROSS-REFERENCE TO RELATED APPLICATION

The present application is a divisional of and claims priority to U.S. application Ser. No. 12/362,218 filed Jan. 29, 2009, the disclosure of which is incorporated herein.

BACKGROUND OF THE INVENTION

The invention relates generally to electric vehicles, and more specifically to the use of a modular internal combustion engine as an auxiliary power unit (APU) for hybrid electric vehicles (HEVs).

Purely electric vehicles typically use stored electrical energy to power an electric motor, which propels the vehicle. Electric vehicles have an intrinsic problem of energy storage, and consequently have a limited driving range. Therefore, APUs are needed to generate additional electricity to the electric vehicle's power system. These APUs both supply a secondary source of energy to the vehicle as needed and recharge the vehicle's primary energy source. Because these APUs are intended to continuously recharge the primary energy source of the electric vehicle, they must be rated according to the vehicle's average power demand.

Traditionally, conventional combustion engines or turbines are used to generate the necessary auxiliary or secondary power. However, both options have drawbacks associated therewith respect to vehicle power generation, thus lowering the effectiveness of the APU. That is, to be effective as an auxiliary power source, it is desirable that the APU have a high efficiency, high reliability, low complexity, and small volume. Conventional combustion engines are overly complex for use as APUs because both the starter and crankshaft are not needed for the generation of electric power. Turbines, on the other hand, have a very low efficiency because the power they generate is often scaled down for use in the electric vehicle.

Therefore, it would be desirable to have an APU assembly capable of efficiently supplying auxiliary power to an electric motor. It would further be desirable to operate the APU assembly in a fashion that optimizes efficiency thereof.

BRIEF DESCRIPTION OF THE INVENTION

The present invention provides a system and method for a modular auxiliary power assembly for an electric vehicle. The modular auxiliary power assembly comprises a number of APUs, each of which includes a free-piston engine and a linear generator. Each APU can be individually controlled to be in either an activated or non-activated state. When activated, each APU can be controlled to operate at a selectable percentage of its total operating capacity. A controller determines an amount of auxiliary power required by an electric motor and/or an energy storage unit and selectively activates a number of APUs to generate the desired auxiliary power.

Therefore, in accordance with one aspect of the present invention, a propulsion system includes an electric motor and an energy storage unit configured to supply a primary power to the electric motor. The propulsion system also includes a plurality of APUs configured to supply a secondary power to at least one of the electric motor and the energy storage unit. Each of the plurality of APUs includes a free-piston engine configured to generate a mechanical output, a linear generator configured to transform the mechanical output to an electrical power, and a controller. The controller receives a power command from the electric motor and/or the energy storage unit, determines an amount of secondary power needed to meet the power command, and selectively activates a number of the plurality of APUs to generate the needed amount of secondary power.

In accordance with another aspect of the invention, a method for supplying auxiliary power to a vehicle includes providing a vehicle propulsion system comprising an electric motor, an energy storage device, and a DC link. The method also includes electrically connecting the electric motor and the energy storage device, electrically connecting each of a plurality of crankshaft-less engine and linear generator combinations to the DC link, and determining a power requirement of the vehicle propulsion system. Further, the method includes selectively activating a number of the plurality of crankshaft-less engine and linear generator combinations to provide power to the DC link based on the vehicle propulsion system power requirement.

In accordance with yet another aspect of the invention, an auxiliary power assembly includes a plurality of auxiliary power units configured to generate a secondary power, each of the plurality of APUs comprising a free-piston combustion engine (FPE) and a linear generator. The auxiliary power assembly also includes a controller, which is configured to sense a power requirement of at least one of an electric motor and an energy storage device, determine an optimal operation strategy of the plurality of APUs based on the sensed power requirement, and operate the plurality of APUs according to the optimal operation strategy to provide the secondary power to at least one of the electric motor and the energy storage device.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings:

FIG. 1 is a cross-sectional diagram of a free-piston internal combustion engine according to an embodiment of the invention.

FIG. 2 is a cross-sectional diagram of a work unit according to another embodiment of the invention.

DETAILED DESCRIPTION

Figure 3:
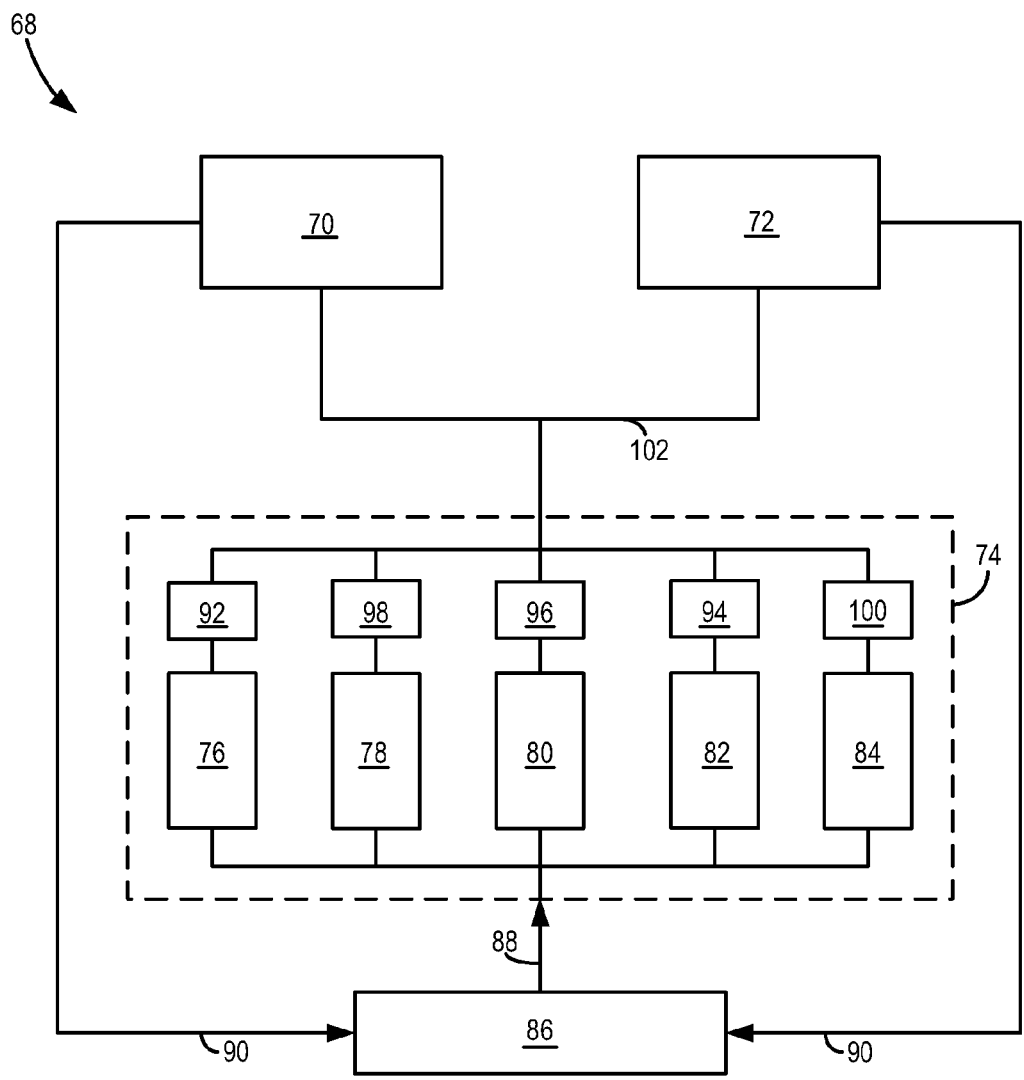
FIG. 3 is a schematic of a vehicle power system according to an embodiment of the invention.

Referring to FIGS. 1 and 2, embodiments of an APU 10, 12 for use with the present invention are shown. Each of the embodiments of the APU 10, 12 are directed to a crankshaft-less or free-piston internal combustion engine (FPE) and generator unit combination. According to embodiments of the invention, a plurality of the APUs 10, 12 of FIG. 1 or 2 are included in an auxiliary power module that supplies secondary power in a hybrid electric vehicle (HEV). Based on a band-limited instantaneous power requirement of the HEV, a number of the APUs in the auxiliary power module are selectively activated to generate an amount of secondary power needed to meet the instantaneous power requirement.

Referring to FIG. 1, APU 10 is shown in cross-section for use with an embodiment of the present invention. APU 10 includes therein a crankshaftless or FPE 14 and a generator unit 16. As shown in FIG. 1, FPE 14 may be configured with one piston 18 and one spring 20. FPE 14 also includes a combustion chamber 22, within which piston 18 is reciprocally disposed, and a piston rod 24 coupled to the piston 18. Mounted on housing 26 are air valves 28, a fuel injector 30, and an exhaust orifice 32. A sealing 34 guides piston rod 24 within the combustion chamber 22. Piston 18 is reciprocally movable between a top dead center (TDC) position and a bottom dead center (BDC) position during an expansion stroke, and is movable between the BDC and TDC position during a compression stroke.

In the embodiment shown in FIG. 1, the FPE 14 of the APU 10 includes a single combustion chamber 22, a corresponding single piston 18, and a returning spring 20. APU 10 also includes a generator/motor 16, which has at least one passive mover 36 rigidly connected to the piston 18 by rod 24 and a stationary generator part 38 positioned in association with the passive mover 36. Stationary generator part 38 may be, for example, a continuous winding coil surrounding the rod 24 and mover 36. In an embodiment, the passive mover 36 is in the form of a synchronous permanent magnet, however, passive mover 36 may be any of a variety of movers that do not require an electrical connection to the stationary generator part 38, such as, for example, an induction machine or a switched reluctance machine. When combustion occurs within combustion chamber 22 and piston 18 moves from a TDC position to a BDC position, mover 36 travels past coil 38, causing an electrical current to be induced within the coil 38.

Referring now to FIG. 2, APU 12 is shown in cross-section for use with another embodiment of the present invention. APU 12 includes a FPE 40 and a generator 42. In the FPE 40, the returning spring 20 of FIG. 1 is replaced by a second piston 44. As such, FPE 40 is configured with two pistons 44, 46 that are connected to one another by piston rod 48. Each piston 44, 46 is reciprocally disposed within a combustion chamber 50, 52, the extents of which is defined by housing 54, 56. Connected to each housing 54, 56 is a fuel injector 58, a number of air valves 60, and an exhaust orifice 62. Firing of the fuel injectors 58 controls movement of pistons 44, 46 and causes mover 64 to travel on a linear path past coil 66, inducing an electrical current within the coil 66.

Referring now to FIG. 3, a schematic of a vehicle power system 68, such as a vehicle propulsion system for a HEV, is shown according to an embodiment of the invention. An energy storage unit 70 and an electric motor electric motor 72 are included in the vehicle power system 68. The energy storage unit 70 is configured to supply a primary power for driving the electric motor 72, which is coupled in driving relationship to wheels (not shown) of the vehicle. An auxiliary power assembly 74 (i.e., auxiliary power module) is also included in vehicle power system 68 for generating an auxiliary or secondary power and is comprised of a number of APUs 76, 78, 80, 82, 84 each of which may be configured as the single piston/returning spring APU 10 of FIG. 1, the dual piston APU 12 of FIG. 2, or any similar linear piston configuration. In one embodiment, APUs 76-84 have a substantially identical power generating capacity, such that each APU 76-84 is capable of supplying an equal fraction of the total power rating of the auxiliary power assembly 74, which is rated at an average power demand of the vehicle power system 68. Although auxiliary power assembly 74 is shown in FIG. 3 as having five APUs 76-84, the number of APUs may be selected based on numerous factors, including, for example, a desired auxiliary power, vehicle size or type, and the size or type of energy storage unit 70 or electric motor 72 configured with the vehicle power system 68. Accordingly, the power capacity of auxiliary power assembly 74 may be scaled up or down by adding or subtracting one or more APUs.

As shown in FIG. 3, vehicle power system 68 includes a controller 86 connected via a first set of control lines 88 to the auxiliary power assembly 74. Controller 86 is also connected via a second set of control lines 90 to energy storage unit 70 or electric motor 72 and receives a power command therefrom. That is, controller 86 is in communication with energy storage unit 70 such that, when a sensed state of charge (SOC) or voltage of the energy storage unit 70 is below a predetermined threshold, the controller 86 receives a recharging request from energy storage unit 70. Similarly, controller 86 is in communication with electric motor 72 such that the controller 86 receives a band-limited instantaneous power requirement of the electric motor 72 during operation thereof. Based on the power command received from the energy storage unit 70 and/or electric motor 72, controller 86 is able to determine an optimal operation strategy for the auxiliary power assembly 74 so as to efficiently provide a needed amount of secondary power for recharging the energy storage unit 70 and/or driving the electric motor 72 according to the received power command. The optimal operation strategy may be based on a control algorithm that maximizes the efficiency of each APU 76-84 and of the overall auxiliary power assembly 74.

According to the optimal operation strategy, controller 86 conveys (via control lines 88) command instructions to the fuel injectors 58 and air valves 60 (FIG. 2) of each APU 76-84 to control generation of an electrical current in each of the APUs. Controller 86 may individually convey command instructions to each APU 76-84 using control lines 88 to activate or deactivate those respective APUs and regulate the electrical current generated in activated APUs based on the power command. When deactivating an APU, controller 86 may regulate limit-cycling and/or short-cycling through a hysteresis circuit. Based on the activated number of APUs, and the received power command, controller 86 may regulate air, liquid, or other medium flow through each activated APU to control cooling thereof. A rectifier or bidirectional converter 92, 94, 96, 98, 100 electrically connected to each APU 76-84 converts the AC electrical current generated by its respective APU 76-84 to a DC output, which may be distributed via a DC link 102 to an energy storage device 70, for example a battery, and/or an electric motor 72. It is contemplated that energy storage device 70 may be any one of a lead-acid battery, gel battery, nickel metal hydride battery, lithium-ion battery, Ni—Cd battery, ultracapacitor, fuel cell, and the like. Furthermore, energy storage device 70 may be comprised of one or any number of individual batteries.

Figure 4:
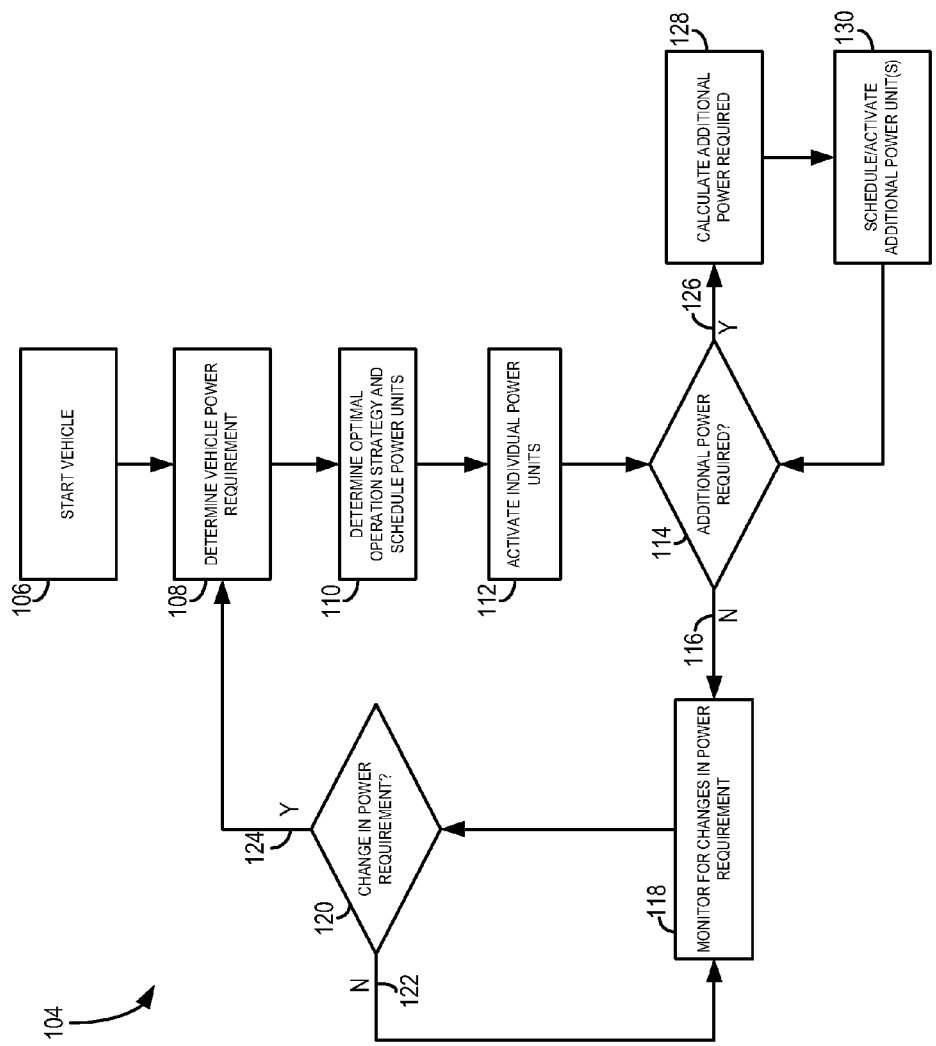
FIG. 4 is a technique for controlling a vehicle power system according to an embodiment of the invention.

According to embodiments of the invention, the auxiliary power assembly 74 may be controlled by controller 86 according to a technique 104 as illustrated in FIG. 4. Technique 104 represents a control strategy for the auxiliary power assembly that determines a total power requirement for a vehicle and schedules individual APUs to each deliver a specific fraction of the total power requirement. According to an exemplary embodiment of the invention, technique 104 operates APUs in such a way as to optimize the efficiency of the vehicle power system.

Technique 104 begins at STEP 106 when a vehicle is started. As the vehicle begins to move, technique 104 determines a real-time power requirement of the vehicle propulsion system at STEP 108. The power requirement is determined based on a power command received from the energy storage unit, electric motor, vehicle auxiliary drive motor(s), and/or electrical loads. That is, the power command may include a recharging request to recharge the energy storage unit when a sensed SOC/voltage thereof is below a pre-determined threshold and/or a secondary power request to supply an additional power to the electric motor to generate a requested motor output based on the real-time power requirement. The requested motor output can be determined by factors including an instantaneous speed of the vehicle, information determined using a GPS from a preset or estimated route, and vehicle-specific parameters such as the size of the vehicle or the size or configuration of the electric motor. Based on the requested motor output, technique 104 determines an optimal operation strategy for the APUs at STEP 110. The optimal operation strategy determines an operation/activation schedule for APUs in the auxiliary power assembly that efficiently provides a needed amount of secondary power for meeting the band-limited real-time power requirement that may include appropriate filtering or smoothing of the signal to avoid excessive activation of APUs based on erroneous noise or very fast transients in the electrical signals.

According to the optimal operation strategy, technique 104 schedules a number of APUs at STEP 110 to operate together and provide a combined auxiliary (i.e., secondary) power to the vehicle. The APUs are individually scheduled/controlled according to the optimal operation strategy. According to an embodiment of the invention, each of the APUs may be scheduled to operate in strictly an "on" (i.e., active) or "off" (i.e., non-active) operating condition. Alternatively, each of the APUs may be scheduled to operate at or above a specific percentage (e.g., 80%) of its individual power-generating capacity in order to improve operational efficiency of the auxiliary power assembly. That is, each of the APUs may be scheduled to operate at a percentage of its total capacity that is above a designated minimum efficiency threshold. For example, if an auxiliary power assembly comprises three individual APUs, technique 104 may schedule a first APU to operate at 80% capacity, a second APU to operate at 80% capacity, and a third APU to be off. Such an operational strategy might be more efficient than operating the first APU at 100% capacity, the second APU at 60% capacity, with the third APU turned off, if the designated minimum efficiency threshold for an APU is determined to be 80%.

According to one embodiment, when scheduling the APUs, technique 104 (via controller 86) determines a transition strategy that allows each cylinder of the crankshaft-less APU to smoothly transition to a higher (or lower) operating efficiency. The transition strategy includes a timing sequence for firing the one or more cylinders of an individual APU. According to one embodiment, the timing sequence causes each cylinder of the crankshaft-less APU to smoothly transition from operating at a first percentage (e.g., 60%) of its individual power-generating capacity to a second, optimal percentage (e.g., 80%) of its power-generating capacity. The transition strategy may also regulate the operating capacity of a first APU to transition from a first operating capacity to a second operating capacity while a second APU is started from, for example, 0% capacity, and ramped up to a desired, optimal capacity, for example 85%. Such a transition strategy may be used to maximize the efficiency of each APU individually and/or the auxiliary power assembly as a whole.

In another embodiment, when scheduling the APUs, technique 104 (via controller 86) determines a timing sequence for firing the one or more cylinders of an individual APU. The timing sequence controls the firing time of the fuel injector(s) associated with each APU in the "on" operating condition in order to minimize audible noise and vibration within the auxiliary power assembly. According to another embodiment, noise and vibration resulting from operation of each "on" APU may also be controlled by regulating/controlling the frequency of firing of each individual fuel injector in order to operate at a frequency other than the critical or natural frequency of its respective APU. Furthermore, the timing sequence may be used to optimize the efficiency of each individual "on" APU by controlling the firing time such that the maximum linear speed of the APU is less than a predetermined maximum value. For example, the timing sequence may control the fuel injectors to fire multiple cylinders of an APU in a defined sequence, rather than firing simultaneously.

The scheduled APUs are activated at STEP 112 to generate the needed amount of secondary power for meeting the band-limited real-time power requirement. Upon activation of the scheduled APUs, the technique continues at STEP 114, where an assessment/determination is made whether the scheduled APUs are producing the required amount of secondary power needed to meet the requested motor output. If no additional secondary power is needed by the vehicle 116, technique 104 begins monitoring for changes in the secondary power requirement at STEP 118. Changes in the secondary power requirement may result from a decrease in the available battery power supply, a change in vehicle speed or a change in road condition or road grade, for example. A determination is made at STEP 120 of whether there has been a change in the power requirement. If there is no change in the auxiliary power requirement 122, technique 104 returns to STEP 118 and continues monitoring for changes. If, however, a change in the secondary power requirement 124 is detected at STEP 120, technique 104 returns to STEP 108 to determine the new secondary power required.

Returning to STEP 114, if the scheduled APUs are not producing the required amount of auxiliary power 126, technique 104 calculates the amount of additional secondary power that is required at STEP 128 and schedules and activates a number of additional power units at STEP 130 as needed to produce the additional secondary power required. Technique 104 then returns to STEP 114 to determine if the additional APUs are producing the required secondary power. Technique 104 thus provides a control strategy for the auxiliary power assembly that selectively and independently operates APUs in such a way as to optimize the efficiency of the vehicle power system.

Therefore according to one embodiment of the invention, a propulsion system includes an electric motor and an energy storage unit configured to supply a primary power to the electric motor. The propulsion system also includes a plurality of APUs configured to supply a secondary power to at least one of the electric motor and the energy storage unit. Each of the plurality of APUs includes a free-piston engine configured to generate a mechanical output, a linear generator configured to transform the mechanical output to an electrical power, and a controller. The controller receives a power command from the electric motor and/or the energy storage unit, determines an amount of secondary power needed to meet the power command, and selectively activates a number of the plurality of APUs to generate the needed amount of secondary power.

According to another embodiment of the invention, a method for supplying auxiliary power to a vehicle includes providing a vehicle propulsion system comprising an electric motor, an energy storage device, and a DC link. The method also includes electrically connecting the electric motor and the energy storage device, electrically connecting each of a plurality of crankshaft-less engine and linear generator combinations to the DC link, and determining a power requirement of the vehicle propulsion system. The method further includes selectively activating a number of the plurality of crankshaft-less engine and linear generator combinations to provide power to the DC link based on the vehicle propulsion system power requirement.

According to yet another embodiment of the invention, an auxiliary power assembly includes a plurality of auxiliary power units configured to generate a secondary power, each of the plurality of APUs comprising a FPE and a linear generator. The auxiliary power assembly also includes a controller, which is configured to sense a power requirement of at least one of an electric motor and an energy storage device, determine an optimal operation strategy of the plurality of APUs based on the sensed power requirement, and operate the plurality of APUs according to the optimal operation strategy to provide the secondary power to at least one of the electric motor and the energy storage device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An auxiliary power assembly comprising:
a plurality of auxiliary power units (APUs) configured to generate a secondary power, each of the plurality of APUs comprising a free-piston combustion engine (FPE) and a linear generator; and
a controller configured to:
sense a power requirement of at least one of an electric motor and an energy storage device;
determine an optimal operation strategy of the plurality of APUs based on the sensed power requirement; and
operate the plurality of APUs according to the optimal operation strategy to provide the secondary power to at least one of the electric motor and the energy storage device;
wherein, in operating the plurality of APUs according to the optimal operation strategy, the controller is further configured to:
operate each of the plurality of APUs in one of an active and a non-active state; and
operate each of the plurality of APUs in the active state above a minimum efficiency threshold to provide the secondary power to at least one of the electric motor and the energy storage device, including selectively operating each of the plurality of APUs in the active state at various speeds and at less than a full power-generating capacity;
wherein, in operating each of the plurality of APUs in the active state at various speeds at less than a full power-generating capacity, the controller is further configured to cause each of the plurality of APUs to generate an equal fraction of the secondary power.

2. The auxiliary power assembly of claim 1 wherein the controller is configured to operate less than all of the plurality of APUs in the active state to provide the secondary power according to the optimal operation strategy.

3. The auxiliary power assembly of claim 1 wherein the controller is configured to operate the plurality of APUs according to the optimal operation strategy to provide at least one of a supplemental power to the electric motor, a supplemental power to an auxiliary load, and a recharging power to the energy storage device.

4. The auxiliary power assembly of claim 1 wherein the controller is configured to individually regulate a firing sequence of fuel injectors associated with each of the plurality of APUs to selectively transition the plurality of APUs between the active state and the non-active state.

5. The auxiliary power assembly of claim 4 wherein the firing sequence of fuel injectors optimizes an operating efficiency of the auxiliary power assembly.

6. A method for supplying auxiliary power to a vehicle comprising:
providing a vehicle propulsion system comprising an electric motor, an energy storage device, and a DC link electrically connecting the electric motor and the energy storage device;
electrically connecting each of a plurality of crankshaft-less engine and linear generator combinations to the DC link;
determining a band-limited power requirement of the vehicle propulsion system;
selectively activating a number of the plurality of crankshaft-less engine and linear generator combinations to provide power to the DC link based on the vehicle propulsion system band-limited power requirement; and
operating each of the activated crankshaft-less engine and linear generator combinations above an efficiency threshold and to deliver an equal fraction of the band-limited power requirement.

7. The method of claim 6 further comprising:
determining a charge requirement of the energy storage device; and
if the charge requirement is below a charge threshold, controlling the plurality of crankshaft-less engine and linear generator combinations to recharge the energy storage device.

8. The method of claim 6 further comprising selectively operating a fuel-injection timing sequence for each of the activated crankshaft-less engine and linear generator combinations to minimize noise and vibration of each of the activated crankshaft-less engine and linear generator combinations.

9. The method of claim 6 further comprising selectively operating a fuel-injection timing sequence for each of the activated crankshaft-less engine and linear generator combinations to operate at a frequency other than a natural frequency of each of the activated crankshaft-less engine and linear generator combinations.

10. The method of claim 6 wherein determining the band-limited power requirement of the vehicle propulsion system comprises determining a band-limited, real-time power requirement of the electric motor.

11. The method of claim 6 wherein operating each of the activated crankshaft-less engine and linear generator combinations above an efficiency threshold and to deliver an equal fraction of the band-limited power requirement further comprises operating each of the activated crankshaft-less engine and linear generator combinations at various speeds at less than a full power-generating capacity, and so as to deliver an equal fraction of the band-limited power requirement.

* * * * *